March 29, 1960  R. A. HERBERGER  2,930,206
VEHICLE AIR CONDITIONING SYSTEMS
Filed Jan. 18, 1956  3 Sheets-Sheet 1
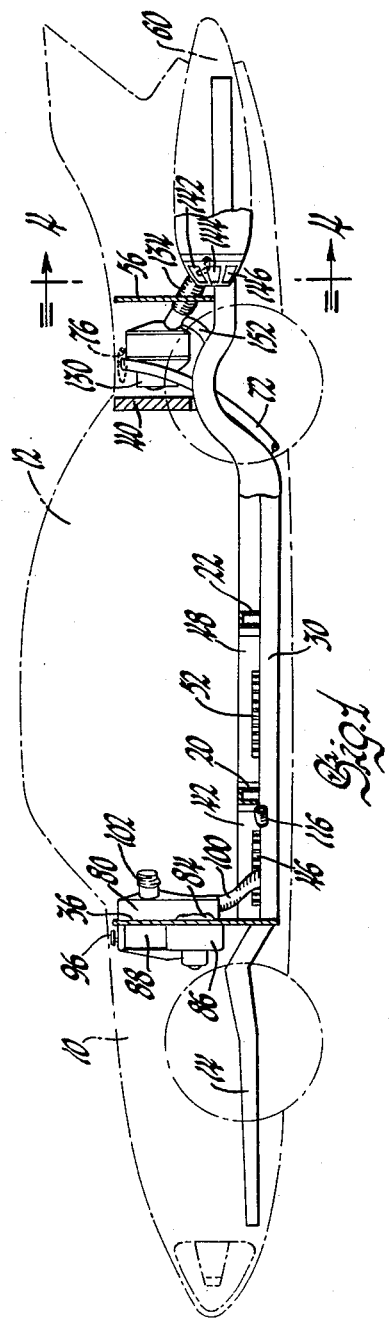
INVENTOR
Robert A. Herberger
BY J. W. Lovett
ATTORNEY

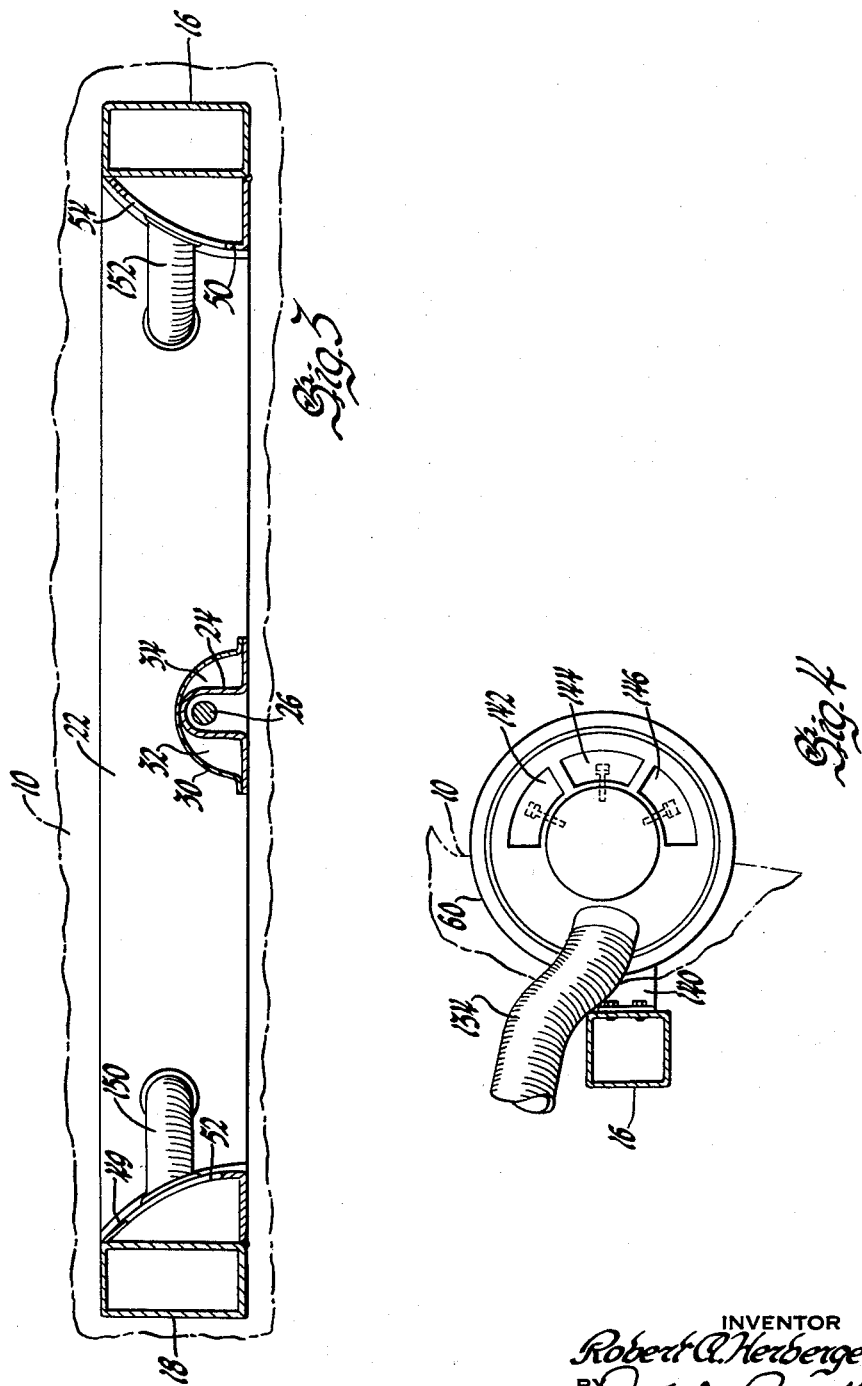

March 29, 1960 R. A. HERBERGER 2,930,206
VEHICLE AIR CONDITIONING SYSTEMS
Filed Jan. 18, 1956 3 Sheets-Sheet 3
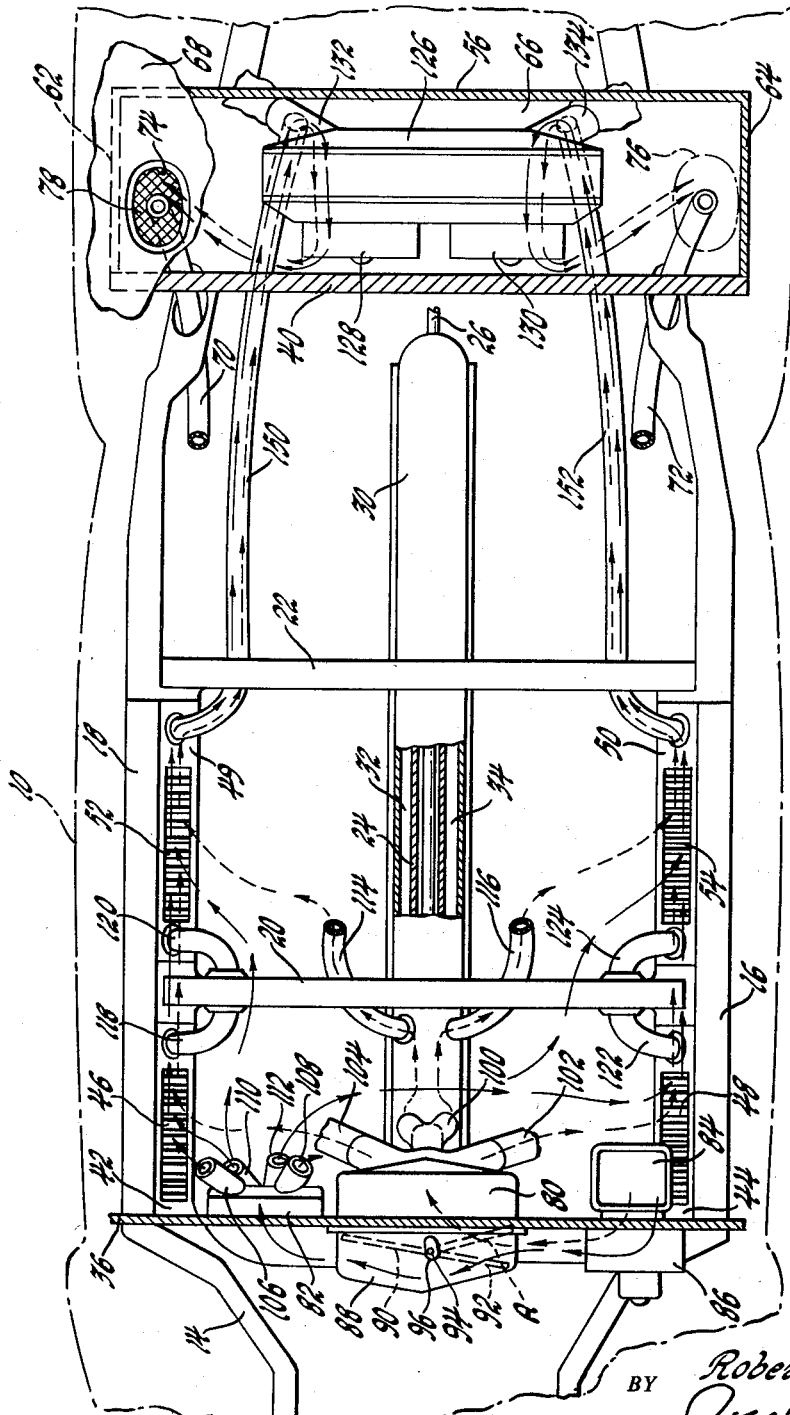
INVENTOR.
Robert A. Herberger
BY
J. W. Lovett
ATTORNEY

United States Patent Office 2,930,206
Patented Mar. 29, 1960

2,930,206

VEHICLE AIR CONDITIONING SYSTEMS

Robert A. Herberger, Lockport, N.Y., assignor to General Motors Corporation, Detroit, Mich., a corporation of Delaware Application January 18, 1956, Serial No. 559,879

3 Claims. (Cl. 62—244)

This invention relates to air conditioning systems and more particularly to air conditioning systems conducive to the comfort of passengers in automobile vehicles.

In heating, ventilating and air conditioning the interiors of automotive vehicle bodies it is customary to maintain air pressures within the passenger compartments slightly above atmospheric pressure in order to prevent or minimize the introduction of drafts or dust through any small cracks or openings which may exist in the body structures. This pressurizing may be caused by ram effect due to motion of the vehicles or it may arise because of blower operation, the latter being preferable as it is effective despite lack of vehicle motion. If a given vehicle is to be air conditioned, maintenance or control of such a pressure is particularly desirable as dust conditions are aggravated during hot weather when air conditioning is most needed. The load placed on the components of any vehicular air conditioning system is substantial and any contribution to the efficiency of operation of the refrigeration units is much to be desired as a supplement to proper pressurization of the air. Not only should the admission of dust to the vehicle body be prevented and efficiency of the units promoted, but circulation of air intimately around the passengers must be subject to such control as to give utmost comfort during severe, mild and fluctuating weather conditions. On vehicles specially built for high speeds the bodies must be tight in the interest of wind noise prevention. This excludes dust, but the necessity of expelling used air obviously becomes more urgent insofar as the passengers are concerned.

With the above problems in mind, an object of the present invention is to provide an improved air conditioning system for a vehicle, the system being such as to maintain an air pressure above atmospheric in the passenger compartment while contributing to more efficient use of the refrigeration equipment and effecting air circulation conducive to passenger comfort.

A feature of the invention is a means for conducting air from the passenger compartment of a vehicle to the condenser of an air conditioning system. Another feature is an evaporator and a condenser arranged adjacent the opposite ends of a passenger compartment and serving an air air conditioning system. Another feature is a small duct and a relatively large duct joined to conduct air from a passenger compartment and the ambient atmosphere, respectively, to a condenser for ultimate discharge to the atmosphere. One other feature is an air conditioning system utilizing a cover for a vehicle drive shaft tunnel as a duct for air. Another feature is a vehicle frame of hollow sections through which air may be guided in flowing through the vehicle by way of the passenger compartment.

These and other important features of the invention will now be described in detail in the specification and then pointed out more particularly in the appended claims.

In the drawings:

Fig. 1 is a phantom side elevation view of an automotive vehicle in which one embodiment of the present invention is installed, pertinent components being diagrammatically illustrated in full lines;

Fig. 2 is a plan view showing the contour of the vehicle in Fig. 1 showing in dot and dash lines the frame and fire wall and components of the air conditioning system again being illustrated diagrammatically;

Fig. 3 is an enlarged sectional view showing the vehicle frame and looking in the direction of the arrows 3—3 in Fig. 2;

Fig. 4 is an enlarged sectional view showing one of the fuel tanks as employed on the vehicle and looking in the direction of the arrows 4—4 of Fig. 1; and Figure 5 is a plan view of the intermediate portions of the vehicle shown in Figures 1 and 2 and is drawn to a larger scale with arrows indicating the directions of flow for heated air and cooled air.

Figs. 1 and 2 depict a vehicle 10 especially adapted for high speed travel and characterized by a sealed or tightly closed passenger compartment 12 and a main frame 14. The latter is made up of hollow sections such as the side members 16 and 18 and the cross members 20 and 22. The frame is also stiffened by a tunnel 24 extending lengthwise of the vehicle and enclosing the vehicle drive shaft 26. It is clear that the tunnel 24 must be joined to a conventional floor structure immediately beneath it and that this floor structure is intimately joined to the side members 16 and 18 as well as to the cross members 20 and 22. In the drawings this floor structure has been omitted. The tunnel 24 is enclosed by an elongated cover 30 of arcuate cross-section and which cooperates with the tunnel 24 to define two elongated air ducts 32 and 34. The forward end of the passenger compartment 12 is defined by a fire wall 36 and the rear end of the passenger compartment is defined by a transverse wall 40 located above and forward of the rear axle.

Extending between and normal to the fire wall and the cross frame member 20 are two ducts 42 and 44 which bear grilled openings 46 and 48, respectively. These ducts are formed along the inner sides of the side members 18 and 16 and are adapted to serve as parts of the air distribution system serving the compartment 12 as will further appear. Two ducts 49 and 50 similar to the ducts 42 and 44 are also provided and extend between the cross members 20 and 22. These ducts are also provided with grilled openings 52 and 54, respectively.

To the rear of and spaced from the transverse wall 40 is a vertical wall 56 and this wall is located immediately forward of two fuel tanks 58 and 60 mounted on opposite sides and at the rear end of the vehicle.

The walls 40 and 56 are joined by walls 62 and 64 to form a condenser compartment 66 closed at its top by the body shell 68 and closed at its bottom by a floor, not shown in the drawings. This floor may be provided with louvers, if desired, and for a purpose as will further appear.

The turbine, or whatever type of motive power element is employed, is supported on the forward end of the frame 14 and exhaust pipes 70 and 72 extend rearwardly therefrom and through the side members of the frame to communicate with the atmosphere by way of elliptical openings 74 and 76 formed in the shell 68. These openings are larger in cross-section than the exhaust pipes so that clearances exist around the latter for the ejection of air from the compartment 66. Each of these openings is provided with a screen such as the screen 78.

The fire wall 36 serves as a support for an evaporator core and casing assembly 80 herein described as an evaporator and a heater core and casing assembly 82 herein called a heater. These assemblies are located within the passenger compartment and on the rear side of the fire wall. The body is provided with an inlet opening, not shown in the drawings, but located forwardly of the windshield and adapted for receiving outside air. This opening communicates with a duct 84 which extends downwardly and then forwardly through the fire wall to the inlet of a blower 86 supported on the forward side of the fire wall. A manifold 88 extends from the outlet of the blower 86 transversely along the forward side of the fire wall to communicate through the latter with the heater 82 and the evaporator 80. The manifold bears a fixed and obliquely placed interior wall 90 which cooperates with a valve 92 pivoted at 94. This valve is movable from and to either of the two positions depicted in Fig. 2. Movement of the valve is effected by means of a crank 96 which, of course, may be actuated by suitable controls, not shown, leading to the passenger compartment.

The evaporator 80 is provided with three outlet ducts 100, 102 and 104. The duct 100 is so arranged as to communicate with the two ducts 32 and 34 in the tunnel cover 30. The ducts 102 and 104 may lead to any suitable points of distribution in the passenger compartment and, in this connection, it has been found advisable to lead them to nozzles located at spaced points on the instrument panel. These nozzles may be so placed as to direct the air outwardly and along the instrument panel in scoops formed in the latter. These scoops are not disclosed herein as they form no part of the present invention and other air distributing devices may be used in place thereof.

The heater 82 is provided with two conduits 106 and 108 leading to windshield defroster nozzles, not shown, and two conduits 110 and 112 leading to any suitable points for distributing heated air to suitable spaced zones of the passenger compartment 12.

Air conduits 114 and 116 are arranged in communication with the ducts 32 and 34, respectively, of the tunnel cover and they may be directed to distribution zones suitable for rear seat passengers within the compartment 12.

Conduits 118 and 120 are arranged to provide communication between the ducts 42 and 49 and conduits 122 and 124 are similarly employed at the other side of the vehicle and with respect to the ducts 44 and 50. These conduits merely serve as connections to make the two ducts at each side of the vehicle continuous in effect. It will be appreciated that the grilled openings 46, 48, 52 and 54 may be provided with sliding covers or other valve means to adjust the effectiveness of the ducts.

Within the compartment 66 is arranged a condenser 126 extending transversely of the vehicle and served by two blowers 128 and 130. These blowers are so arranged in parallel as to discharge into the compartment 66 and to draw air through the core of the condenser 126. The rear side of the condenser casing is fitted with two air inlet ducts 132 and 134. These ducts communicate with the ambient atmosphere and are of large capacity insuring adequate cooling of the condenser. The air inlets for the conduits 132 and 134 are arranged on the fuel tank structures 58 and 60. As these tank structures are similar, only the tank structure 60 is described herein. This structure is supported on the frame 16 by means of a bracket 140, as seen in Fig. 4, and a large portion of the fuel tank 60 is outside of the body shell. The forward end of the fuel tank 60 is provided with a chamber separated from the fuel. The chamber wall is fitted with three covers 142, 144 and 146 which are solenoid operated to uncover openings for conveying outside air from the chamber to the duct 134.

Communicating with the rear end zones of the frame ducts 49 and 50 are two air exhaust ducts 150 and 152. Each of these ducts is of smaller capacity than either of the ducts 132 or 134. These relatively small capacity ducts 150 and 152 extend rearwardly and respectively communicate with the large capacity ducts 132 and 134 leading to the condenser core.

Assuming that the valve 92 is in the position indicated as A in Fig. 2, air for heating the vehicle is admitted by the duct 84 to the blower 86 and directed by the manifold 88 to the heater core 82 for proper distribution within the passenger compartment. At such a time, of course, the evaporator 80 would not be activated to cool air passing therethrough and the condenser 126 would have no useful function, but the blowers 128 and 130 would serve to cause proper evacuation of used heated air from the passenger compartment by withdrawing air through the small capacity ducts 150 and 152 and discharging that air from the compartment 66 and through the openings 74 and 76. The blower 86 and the blowers 128 and 130 would be so operated and the capacity of the air exhaust ducts be so restricted as to size that a pressure slightly above atmospheric is assured within the passenger compartment 12.

When weather conditions require air conditioning or cooling, then the valve 92 is shifted forwardly to cut off air flow from the blower 86 to the heater 82 and to direct that air through the evaporator 80 for distribution through the ducts 100, 102 and 104. The tunnel cover and the ducts 114 and 116 would aid in this distribution. Under such conditions the condenser 126 is operated effectively to reduce the heat content of the coolant used in the evaporator 80 as is practiced in conventional refrigeration systems. In the present instance, however, used air is taken from the passenger compartment 12 and such air in its cooled state is directed by the relatively small capacity ducts 150 and 152 to increase the efficiency or heat reducing effect of the condenser 126 upon the evaporator coolant. In air conditioning, as in heating, the air flow through the ducts 150 and 152 is limited to insure pressurization of the compartment 12. In this instance the air discharged by the blowers 128 and 130 is taken, for the most part, from the fuel tank air inlets which are opened. The air is exhausted or forced from the compartment 66 around the exhaust pipes 70 and 72 to cool the latter. In some instances this discharge of cooled air from the compartment 66 is not adequate in which event louvers, heretofore mentioned but not disclosed in the drawings, should be provided in the floor member defining the compartment 66 so that air may more freely escape.

Figure 5 illustrates the direction of flow for the heated air by means of solid line arrows, this air being guided from the outlets in the manifold 82 to the passenger compartment and discharged from the latter by means of the grilled openings 46, 48, 52 and 54 leading to the conduits 150 and 152. These, in turn, are connected to the condenser 126 from which air is directed out of the car through the grilled openings 74 and 76. The cooled air flow is shown by the broken arrows and that air leads from the evaporator 80 and the ducts 32 and 34 into the passenger compartment by means of the conduits 102, 104, 114 and 116. Cooled air is discharged by way of the grilled openings 46, 48, 52 and 54 and the conduits 150 and 152 to the condenser 126 and the grilled openings 74 and 76. From this, it may be seen that heated air and cooled air are admitted to the passenger compartment by different paths but are discharge from that compartment through the same paths.

From the above, it may be seen that an air conditioning system is provided permitting adequate control of the air pressure within the passenger compartment 12 and which increases the effectiveness of the condenser when air conditioning is required, and the entire arrangement permits a wide variety of controls for directing proper air circulation to contribute to passenger comfort.

I claim:

1. An air conditioning system for an automotive vehicle having a drive shaft cover extending the length of a passenger compartment, said system employing said cover as a duct, an evaporator and blower cooperatively arranged at one end of said compartment to cool outside air and direct the same into said compartment by way of said duct, a condenser associated with a blower arrangement in a rear portion of said vehicle and adapted for lowering the heat content of coolant used in said evaporator, restricted means for conducting air from said compartment mixed with ambient air back to the atmosphere by way of said condenser, and the arrangement being such as to maintain said passenger compartment above atmospheric pressure.

2. An air conditioning system for an automotive vehicle having a passenger compartment, a frame of hollow sections, a body shell, and at least one engine exhaust pipe, said system comprising an evaporator and blower cooperatively arranged adjacent the forward end of said compartment to cool and direct outside air into said compartment, a second compartment enclosing a condenser and associated blower arrangement located adjacent the rear end of said passenger compartment, said condenser being adapted to lower the heat content of coolant discharged from said evaporator and arranged as a guide for the passage of air to said second compartment, a large capacity duct for ambient air leading from the outside of said vehicle to said condenser, a relatively small capacity duct leading from said compartment through at least one of said hollow sections to said large capacity duct, said exhaust pipe extending through said second compartment, and an opening in said body shell for directing air discharged by said blower arrangement into contact with said exhaust pipe and then to atmosphere.

3. An air conditioning system for the pressurized body shell of an automotive vehicle having a passenger compartment and a condenser compartment, said system comprising an evaporator and a blower arrangement forward on said vehicle and arranged to direct cooled outside air into said passenger compartment, a condenser and a blower arrangement in said condenser compartment and adapted to discharge air into said condenser compartment, said condenser being adapted to cool the coolant used in said evaporator, a first conduit for admitting ambient air directly to said condenser, a second conduit for conducting cooled air from said passenger compartment to said first conduit to form a mixture of cooled air and ambient air, an opening in that portion of said body shell forming a wall of said condenser compartment, and an engine exhaust pipe clear of the periphery of said opening and arranged to exhaust engine gases through the latter.

References Cited in the file of this patent

UNITED STATES PATENTS

| | | |
|---|---|---|
| 2,070,379 | Stramaglia | Feb. 9, 1937 |
| 2,100,834 | Chapman | Nov. 30, 1937 |
| 2,451,366 | Terry | Oct. 12, 1948 |
| 2,479,170 | Kuempel | Aug. 16, 1949 |
| 2,523,923 | Rodert | Sept. 26, 1950 |
| 2,696,774 | Bayley | Dec. 14, 1954 |